(12) United States Patent
Tussy

(10) Patent No.: US 9,671,064 B2
(45) Date of Patent: Jun. 6, 2017

(54) DEVICE CASE WITH STRAP

(71) Applicant: Kevin Alan Tussy, Henderson, NV (US)

(72) Inventor: Kevin Alan Tussy, Henderson, NV (US)

(*) Notice: Subject to any disclaimer, the term of this patent is extended or adjusted under 35 U.S.C. 154(b) by 113 days.

(21) Appl. No.: 14/094,649

(22) Filed: Dec. 2, 2013

(65) Prior Publication Data

US 2014/0152034 A1 Jun. 5, 2014

Related U.S. Application Data

(63) Continuation-in-part of application No. 29/441,775, filed on Jan. 9, 2013, now Pat. No. Des. 719,949, and a continuation-in-part of application No. 29/439,376, filed on Dec. 10, 2012, now Pat. No. Des. 717,780, which is a continuation-in-part of application No. 29/438,701, filed on Dec. 1, 2012, now abandoned.

(60) Provisional application No. 61/858,490, filed on Jul. 25, 2013, provisional application No. 61/732,301, filed on Dec. 1, 2012, provisional application No. 61/888,429, filed on Oct. 8, 2013.

(51) Int. Cl.

| A45F 5/00 | (2006.01) |
|---|---|
| F16M 13/04 | (2006.01) |
| F16M 11/10 | (2006.01) |
| F16M 13/00 | (2006.01) |
| H04M 1/04 | (2006.01) |
| H04B 1/3888 | (2015.01) |

(52) U.S. Cl.
CPC ............ *F16M 13/04* (2013.01); *F16M 11/10* (2013.01); *F16M 13/00* (2013.01); *H04B 1/3888* (2013.01); *H04M 1/04* (2013.01); *A45F 2005/008* (2013.01)

(58) Field of Classification Search
CPC ........ A45F 2005/008; A45F 2200/0508; A45F 2200/0516; A45F 5/00; A45F 2005/006; A45F 2200/0525; A45F 5/10; A45C 2011/001; A45C 2011/002; A45C 2011/003; Y10S 224/93
USPC ................................................. 224/217, 218
See application file for complete search history.

(56) References Cited

U.S. PATENT DOCUMENTS

| D377,049 | S | 12/1996 | Guyer et al. |
|---|---|---|---|
| D384,499 | S | 10/1997 | Gaestel |
| D590,151 | S | 4/2009 | Karobkina et al. |
| D602,492 | S | 10/2009 | Wang |
| D610,798 | S | 3/2010 | Silvera |
| D623,180 | S | 9/2010 | Diebel |
| D631,482 | S | 1/2011 | Yu et al. |
| D669,480 | S | 10/2012 | Piedra et al. |
| 8,374,657 | B2 * | 2/2013 | Interdonato ................ 455/575.4 |
| D679,685 | S | 4/2013 | Cox |

(Continued)

*Primary Examiner* — Adam Waggenspack
(74) *Attorney, Agent, or Firm* — Weide & Miller, Ltd.

(57) ABSTRACT

A case for a portable electronic device includes a base plate, a device securing mechanism operable to hold the electronic device adjacent to the base plate, and a stretchable strap connected to the base plate. The strap is biased toward a rest position, wherein the strap lies substantially flush with the base plate. The strap is configured to be stretchable between the rest position and a stretched position away from the back of the base plate to allow a user's hand or other item to be placed between the strap and the case.

15 Claims, 11 Drawing Sheets

(56) References Cited

U.S. PATENT DOCUMENTS

| | | | | |
|---|---|---|---|---|
| 8,428,664 | B1 * | 4/2013 | Wyers | H04M 1/185 |
| | | | | 455/575.1 |
| D686,606 | S | 7/2013 | Hong | |
| D686,607 | S | 7/2013 | Hong | |
| D695,013 | S | 12/2013 | Minn et al. | |
| D696,256 | S | 12/2013 | Piedra et al. | |
| D701,043 | S | 3/2014 | Minn et al. | |
| 8,939,483 | B2 * | 1/2015 | Kim | H04B 1/385 |
| | | | | 224/217 |
| 8,973,795 | B2 * | 3/2015 | Chiu, Jr. | A45F 5/021 |
| | | | | 224/218 |
| 2005/0205623 | A1 * | 9/2005 | Buntain | 224/217 |
| 2011/0309117 | A1 * | 12/2011 | Roberts | 224/217 |
| 2012/0187706 | A1 * | 7/2012 | Kannaka | 294/137 |
| 2012/0247991 | A1 * | 10/2012 | Meehan | G06F 1/1628 |
| | | | | 206/320 |
| 2014/0034521 | A1 * | 2/2014 | Liu | 206/45.23 |

* cited by examiner

DEVICE CASE WITH STRAP

RELATED APPLICATIONS

The present application claims priority to U.S. Provisional Patent Application No. 61/732,301, filed Dec. 1, 2012, and U.S. Provisional Patent Application No. 61/858,490, filed Jul. 25, 2013 and this application also claims priority to and is a continuation-in-part of U.S. Design patent application No. 29/441,775 filed Jan. 9, 2013 and is a continuation-in-part of U.S. Design patent application No. 29/439,376 filed Dec. 10, 2012, both of which claim priority to and are a continuation-in-part of U.S. Design patent application No. 29/438,701 filed Dec. 1, 2012.

FIELD OF THE INVENTION

The present invention relates generally to cases for portable electronic devices, including cell phones, smartphones, tablets, portable digital music players and the like.

BACKGROUND OF THE INVENTION

The use of portable electronic devices has proliferated society in recent years. The number of applications and functions available for use on such devices continues to increase, necessitating increasingly more handling time by a user. This requires that the user hold the electronic device, which prevents the user from holding other items or performing other tasks with their hands. In order to reduce and/or prevent damage to a device that may occur should the user drop the device, various types of device cases have been introduced.

Some such device cases include a securing strap for situations where it is preferable for a user to hold a device securely in one hand. While various types of securing straps have been developed for such device cases, existing straps increase the bulk and complexity of the device case itself.

For example, some electronic devices include a Velcro strap that can wrap around one's arm to secure the device to the user. However, this strap suffers from being bulky and when not in use, the Velcro strap is often in the way when using and storing the electronic device.

Other cases for electronic devices have been proposed that simply protect and prop up the electronic device. These cases suffer from being awkward to hold and requiring one or more hands to hold.

SUMMARY OF THE INVENTION

To overcome the drawbacks of the prior art and provide additional benefits a case for a portable electronic device is disclosed comprising a base plate and a device securing mechanism operable to retain the electronic device adjacent to the base plate. Also part of this configuration is a stretchable strap connected to the base plate such that the stretchable strap is biased toward a rest position which is substantially flush with the base plate and the strap is also configured to be stretchable between the rest position and a stretched position spaced from the base plate.

In one configuration the device securing mechanism comprises a side wall extending from the base plate and a flange extending from the side wall such that the flange retains the device adjacent to the base plate. The strap has elasticity sufficient to bias the strap toward the rest position after stretching. In one embodiment the base plate includes a side wall, with the strap lying substantially flush with the side wall when in the rest position. The base plate may include a strap recess, with the strap being seated in the strap recess when in the rest position. In one configuration the strap recess is disposed on the base plate.

In one configuration the base plate may include an interior face, an exterior face, and a slot extending through the base plate such that the strap connects to the base plate at the interior face and extends through the slot to expose and allow access to the strap from the exterior of the case. The case described above may also include a hinged arm extending from the base place to selectively stretch the strap. The strap may attach to the base plate with a pin. In one embodiment, the strap is formed using injection molding, with the pin being placed into the mold prior to injection.

Also disclosed is a case for a portable electronic device having a front and a rear, such that the case includes a base plate having an interior face and an exterior face. A device securing mechanism is also provided and is operable to retain the device adjacent to the base plate such that the rear of the device rests against the interior face of the base plate while the front of the device remains substantially uncovered for interaction by a user, such as with a touch screen or one or more buttons. A strap is connected to the base plate and movable between a rest position and a stretched position, with the strap having an elasticity that is sufficient to bias the strap toward the rest position.

In one embodiment the strap rests substantially flush against the exterior face of the base plate when in the rest position. The case of claim 11, wherein the base plate includes a side wall, with the strap resting substantially flush against the side wall when in the rest position. In one exemplary configuration the device securing mechanism comprises a side wall extending from the base plate and a flange extending from the side wall such that the flange retains the device adjacent to the base plate.

Also disclosed is a case for a portable electronic device to store an electronic device that has a back surface and a front surface. In one exemplary embodiment the base plate has an interior face and an exterior face. An electronic device securing mechanism is provided and is operable to retain the back surface of the electronic device against the interior face of the base plate. A flexible strap is attached to the base plate and is movable between a rest position and a stretched position. The strap may be accessible from the exterior of the case.

The strap may be configured to lie substantially flush with the base plate when in the rest position. In addition, the base plate may include a slot extending through the base plate so that the strap connects to the interior face of the base plate and extends through the slot to provide access to the strap from the exterior of the case.

In one exemplary configuration the device securing mechanism includes a side wall extending from the base plate and a flange extending from the side wall such that the flange secures the device to the base plate. The side wall may extend from the interior face of the base plate. In one embodiment, the side wall extends substantially perpendicularly from the base plate and the flange extends substantially perpendicularly from the side wall, such that the flange and the base plate are substantially parallel.

BRIEF DESCRIPTION OF THE DRAWINGS

Various other objects, features and advantages of the present invention will become fully appreciated when considered in conjunction with the accompanying drawings, wherein like reference characters denote the same or similar parts throughout the several views.

DETAILED DESCRIPTION

Figures 1, 2:
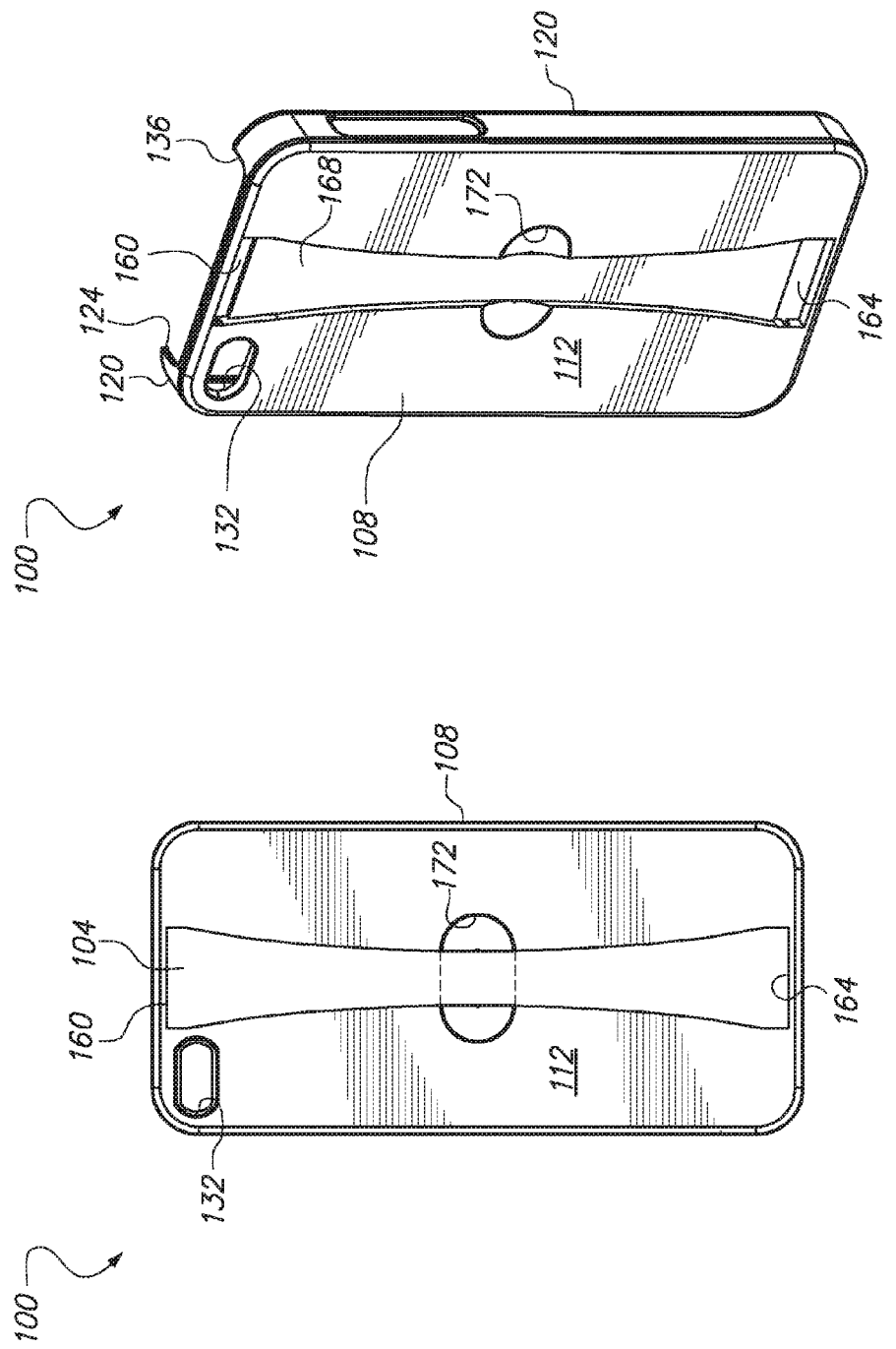
FIG. 1 illustrates an exterior view of a device case having a strap according to the present invention.
FIG. 2 illustrates a perspective view of the exterior of the device case of FIG. 1.

Referring to the drawings, wherein like reference numbers refer to like components, FIGS. 1-4 show a case 100 for a personal electronic device (not shown) including a flexible strap 104. In general, the flexible strap 104 is connected to the case 100 at one or more locations and is generally flush with a back of the case. The strap 104 is capable of being stretched away from the case 100 to allow the user's hand or other item to be placed between the strap and the case. The strap 104 is biased to return flush with the case and thus it compresses against the user's hand or other item that was placed between the strap and the case. This in turn secures the case, with the electronic device associated with the case, to the user's hand or item.

Figure 4:
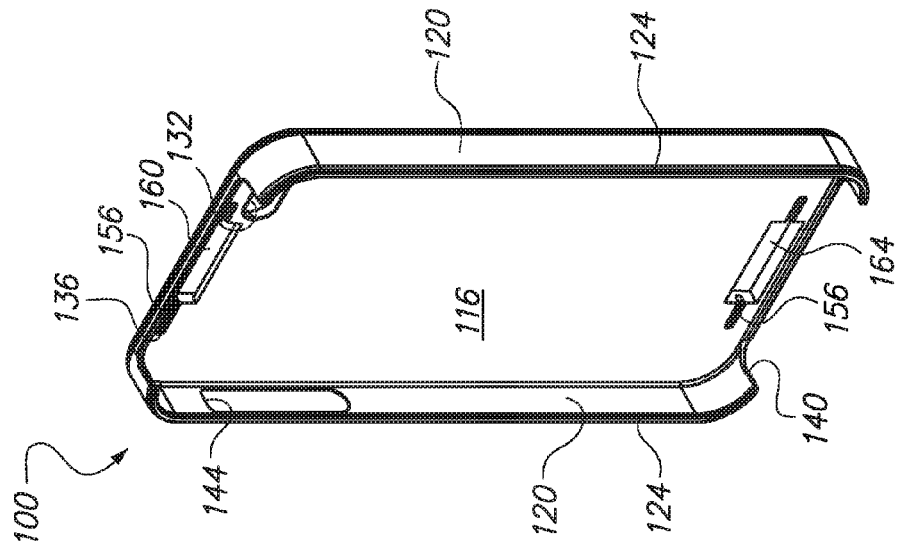
FIG. 4 illustrates a perspective view of the interior of the device case of FIG. 1.
Figure 3:
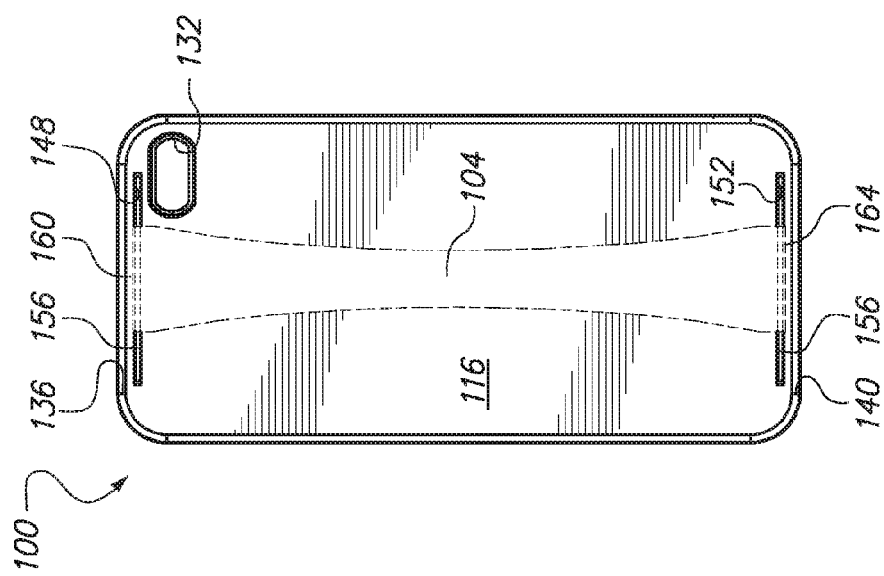
FIG. 3 illustrates an interior view of the device case of FIG. 1.

In the example embodiment of FIG. 1-4, the case 100 comprises a base plate 108 having an exterior face 112, shown in FIG. 1 and FIG. 2, and an interior face 116, shown in FIG. 3 and FIG. 4. As best seen in FIG. 4, at least one side wall 120 extends from the periphery of the interior face 116 of the base plate 108. A flange 124 extends inward from at least a portion of the side wall 120, with the base plate 108, the side wall 120 and the flange 124 defining a device-receiving cavity of approximately the same size and shape of the device. The device is fitted into the case 100 such that the rear of the device rests against the interior face 116 of the base plate 108, with the flange 124 retaining the device adjacent to the case 100. In one embodiment, the flange 124 covers only a small portion of the periphery of the front of the device, such that user interaction with the front of the device remains substantially unimpeded when the device is secured in the case 100.

In one example embodiment, the device is a substantially rectangular cell phone, and the side wall 120 extends from the base plate 108 substantially perpendicularly. The flange 124 extends inward perpendicularly from the side wall 120, such that the flange 124 lies substantially parallel to the base plate 108. The flange 124 is spaced from the base plate 108 approximately the same distance as the thickness of the device. In one embodiment, the base plate 108, the side wall 120 and the flange 124 are formed integrally from an elastomeric material. However, each component may be comprised of a different material, elastomeric or not, within the scope of the present invention. Additionally, each component may comprise more than one type of material. For example, the base plate 108 may be formed partially of an elastomeric material and partially of a non-elastomeric material. The case 100 may also employ an internal skeleton made of a harder material, with a softer material forming the exterior.

The base plate 108 defines a camera aperture 132, while the side wall 120 defines an upper aperture 136, a lower aperture 140 and a side aperture 144. The apertures 132, 136, 140, 144 are placed to allow the user to access device ports on the device while the device is housed within the case 100. By way of example, the camera aperture 132 allows a device camera present on the rear of the device to remain unblocked when the device is in the case 100. Similarly, the upper aperture 136 may allow access to a device power switch, the lower aperture 140 may enable the use of a device charger, and the side aperture 144 may allow access to device volume controls. In other embodiments the opening and apparatus may be located at other locations depending on the configuration of the electronic device.

In one embodiment, the side wall 120 is continuous about the perimeter of the base plate 108, with the height of the side wall 120 varying to create the upper and lower apertures 132, 136. Two flanges 124 are thus employed, with the flanges 124 beginning at the upper aperture 132 and ending at the lower aperture 136. It should be apparent that any number of flanges 124 may be used, with the number and placement of the flanges 124 being selected to best secure a particular device while minimizing restrictions to device feature access. Additionally, the side wall 120 need not be continuous. A plurality of side walls 120 may extend from the base plate 108, with each side wall 120 potentially having its own flange 124. It should also be noted that while the above described embodiment employs side wall 120 and flanges 124 to retain the device adjacent to the base plate 108, any other device securing mechanism may be used to secure the device to the case 100, that is, to retain the device adjacent to the base plate 108, within the scope of the present invention.

The interior face 112 of the base plate 108 defines an upper recess 148 and a lower recess 152. Mounting pins 156 affix to the strap 104 and seat within the recesses 148, 152 to connect the strap 104 to the base plate 108. The strap 104 is molded from an elastomeric substance such as silicone, or any stretchable material that is biased to return to an original length or shape. The pins 156 may be coated with an adhesive and placed in a mold prior to injection of the silicone, thereby affixing the pins 156 to the strap 104. The pins 156 may be textured to provide more surface area to which the silicone can adhere. For example, the pins 156 may be wrapped with a thin piece of textured plastic in a criss-cross pattern prior to placement in the mold.

The molding process prevents the strap 104 from bunching up at the center of the pins 156, providing an exemplary fit and clean appearance. However, the pins 156 could connect with the strap 104 in a variety of other ways within the scope of the present invention. For example, the strap 104 may have looped ends, with the pins 156 fitted through the loops prior to being seated within the recesses 148, 152. In one embodiment, snap-fit connections between the pins 156 and the base plate 108 are provided. However, any other connection may be utilized including but not limited to screws, glue, molded connections, or integral molding. Additionally, the pins 156 may removably connect to the base plate 108, allowing the strap 104 to likewise removably connect, or may be fixably attached to the base plate 108.

The base plate 108 further includes an upper slot 160 and a lower slot 164. The strap 104 may extend through the base plate 108 at the slots 160, 164, with the strap 104 lying substantially flush against the exterior surface 116 of the base plate 108 when not in use, i.e., when the strap 104 is in a rest position. The strap 104 may also be configured to extend beyond a plane formed by the back of the base place 108 to allow the strap to contact and thus grip any surface upon which the case is set. (See FIG. 14A.) It is also contemplated that the strap 104 may extend beyond the base plate 108 only near the center of the strap or at end ends of the strap, such as near the pins. This prevents the case from sliding down on an angle surface since the face of the strap 104 that extends beyond the back of the base plate 108 will contact and grip the surface. This configuration also provides the benefit of reducing or preventing scratches on the back of the base plate 108 due to reduced contact of the back of the place 108 on a surface upon which it rests.

The slots 160, 164 may be reinforced to prevent wear and tear on the base plate 108. The exterior surface 116 of the base plate 108 may define a strap recess 168 in which the strap 104 sits such that the strap 104 does not break the plane of the base plate 108 when in the rest position. Alternatively, the strap 104 may extend beyond the back plane of the base plate 108 even when at rest.

Figure 5:
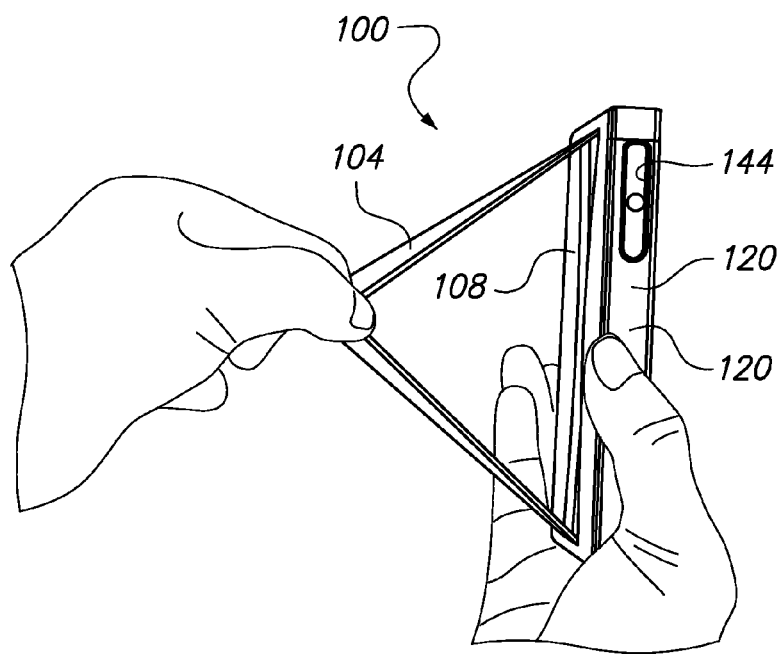
FIG. 5 illustrates the device case from FIG. 1 with the strap in a stretched position.
Figure 6:
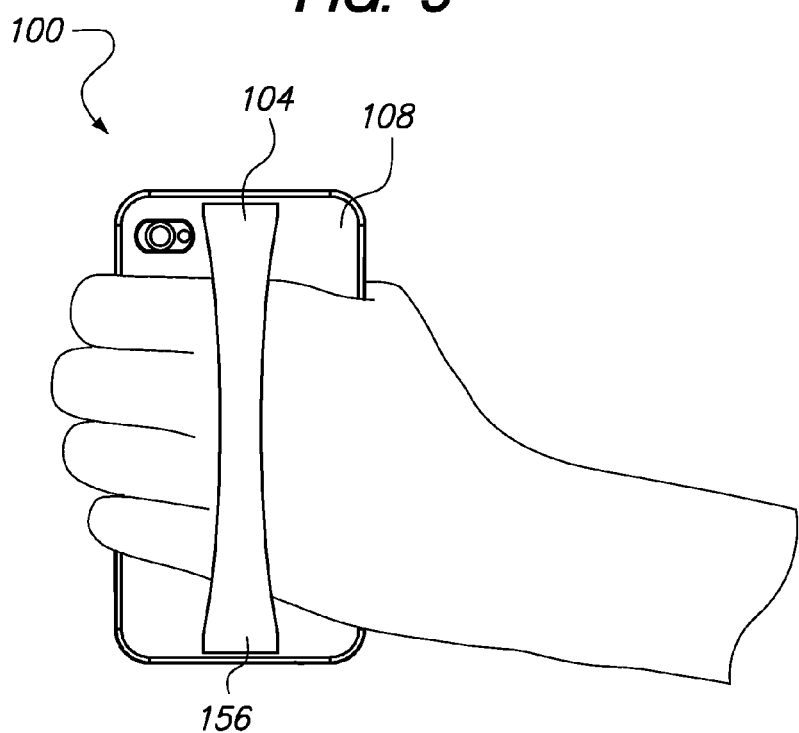
FIG. 6 illustrates the device case from FIG. 1 in use.

As shown in FIG. 5 and FIG. 6, the strap 104 is movable between the rest position and a stretched position. The exterior face 116 of the base plate 108 may include a grip-assist recess 172 to assist a user in grasping the strap 104 for movement from the rest position to the stretched position. In the stretched position, the strap 104 is spaced from the base plate 108, thus allowing insertion of a hand or other object between the strap 104 and the base plate 108. The strap 104 may elastically deform to reach the stretched position. It should be recognized that a number of theoretical "stretched positions" are possible depending on the forces exerted on the strap 104. In one embodiment, the strap 104 is able to stretch at least 2 times is original length. The strap 104 may be configured to be is resistant to tears, runs, and cuts. In one configuration the strap 104 is resistant to oils, such as from human skin, lotions, liquids and the like. Likewise, the strap 104 is configured to avoid staining or interacting with such oils or chemicals and is anti-static in nature. The strap 104 may be configured with one or more additives to establish it as glow in the dark or to release a smell or fragrance when stretched or scratched. It is contemplated that the strap 104 may be replaced or interchanged to provide customization such as by text, numbers, color, density, stretchability, and length. The strap 104 is configured to be operatable and functional in temperatures from at least 40 to 130 degrees Fahrenheit. The strap may have a durometer value near or at 26. In one embodiment the strap is configured with a 400% stretch factor with better than 90% recovery in 10 seconds. In other embodiments other parameters are contemplated to meet the needs of the user of the innovative case described herein.

The elasticity of the strap 104 is sufficient to bias the strap 104 toward the rest position. Thus, when the strap 104 is in the stretched position, it will tend to follow the contour of any objects disposed between the strap 104 and the base plate 108. For example, FIG. 6 shows a user grasping a device with the user's hand between the strap 104 (in a stretched position) and the base plate 108. The strap 104, being biased toward the rest position, thus hugs and grips the user's hand, thereby enhancing the user's grip on the device. This configuration can be particularly useful when using the device during activities requiring movement of the user's hands, such as walking, jogging or using the hands for other tasks.

The strap 104 may be molded into any shape, with the number of connection points between the strap 104 and the base plate 108 varying based on the intended device and other relevant design criteria. For larger devices such as tablets, more than one strap 104 may be utilized, with each strap 104 extending along the length or width of the case 100 only partially. The strap 104 may be any shape or extend in any direction, such as side to side, top to bottom, or diagonally. The strap 104 may be manufactured to be slightly shorter in length than the opening in the case 100 to add tension to the strap 104. Indents or cut-outs (not shown) may be introduced along the strap 104 to allow a user to more easily grasp the strap 104, while also tailoring the flexibility of the strap 104. For example, a logo or other design may be embossed into the strap 104, thus increasing the amount of material used in certain portions of the strap 104 making those portions less flexible, and decreasing the amount of material used in other portions of the strap 104 making those portions more flexible. Addition of a logo would also allow the strap 104 to be incidentally used for marketing purposes. The indents or cut-outs may be added during the molding process, mechanically, or using any other process.

The strap 104 may be composed of more than one type of material. For example, the ends of the strap 104 may be formed from a harder or less elastic material such as thermoplastic rubber, while the material in the center of the strap 104 may be formed from a softer and/or more elastic material such as thermoplastic elastomer. Or, the center may be less elastic with one or more of the ends having greater elasticity. Both materials may be injected simultaneously during a first mold, or one or more portions of the strap 104 may first be molded, such as the ends, with those portions then being placed into a second mold. The strap 104 may also be formed from one type of material, with the material having differing properties depending on the portion of the strap 104 where it is used. For example, the ends could be formed from a harder silicone, with the center being formed from a softer, more flexible silicone.

Figure 7:
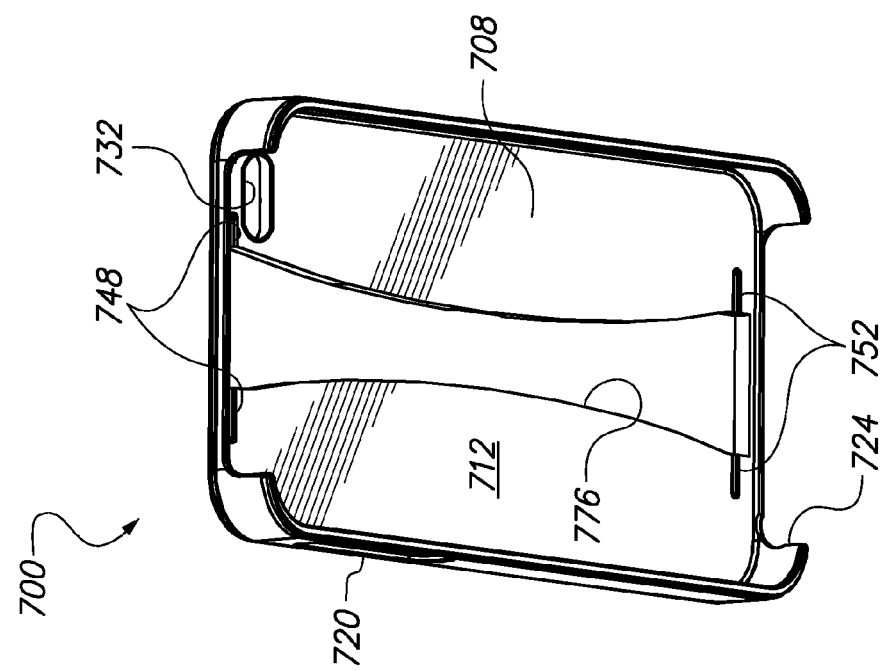
FIG. 7 illustrates another embodiment of a device case having a strap according to the present invention.

FIG. 7 depicts a device case 700 including a side wall 720 extending from the periphery of the interior face 712 of a base plate 708. Flanges 724 operable to secure the device to the case 700 extend inward from the side wall 720, with the base plate 708, the side wall 720 and the flanges 724 defining a device-receiving cavity. The base plate 708 defines a camera aperture 732, while the side wall 720 defines a side aperture 744. The interior face 712 of the base plate 708 defines an upper recess 748 and a lower recess 752 for receiving mounting pins 756 to mount a strap 704 thereto. The base plate 708 further defines a strap aperture 776, allowing access to the strap 704 from the exterior of the case 700 without threading the strap 704 through slots in the base plate 708.

Figure 8:
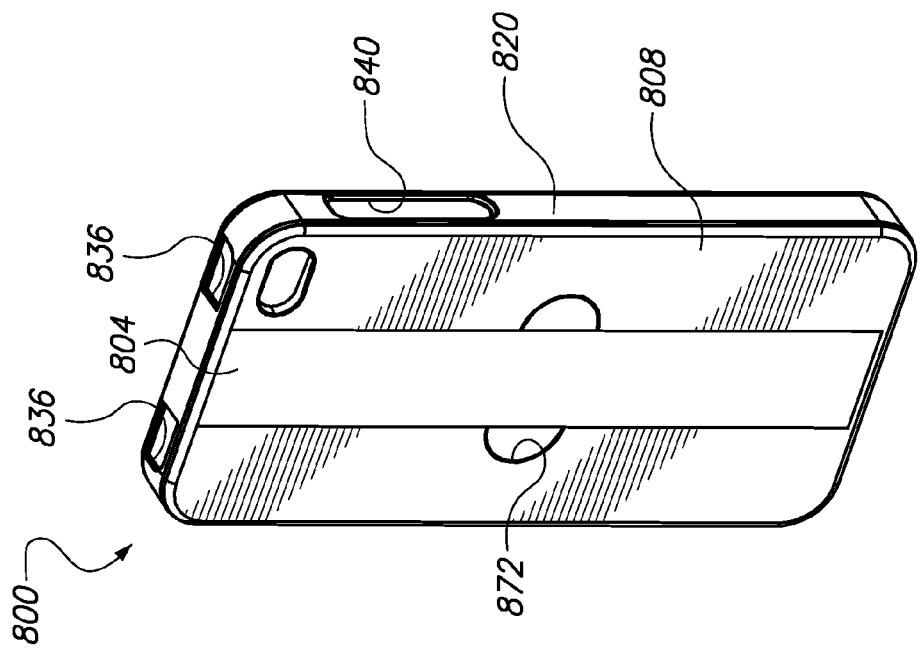
FIG. 8 illustrates yet another embodiment of a device case having a strap according to the present invention.

In FIG. 8, a device case 800 having a strap 804 includes a side wall 820 extending from the interior face (not shown) of a base plate 808. The strap 804 is substantially rectangular, while the side wall 820 is substantially continuous about the periphery of the base plate 808. This example embodiment provides an alternative embodiment of the strap 804 shape. Any the strap 804 may be configured in any shape. The side wall 820 defines upper apertures 836 and side aperture 840 for allowing access to device features when the device is housed within the case 800. The base plate 808 defines a grip-assist recess 872 to assist a user in moving the strap 804 between a rest position, as shown, and a stretched position.

Figure 9:
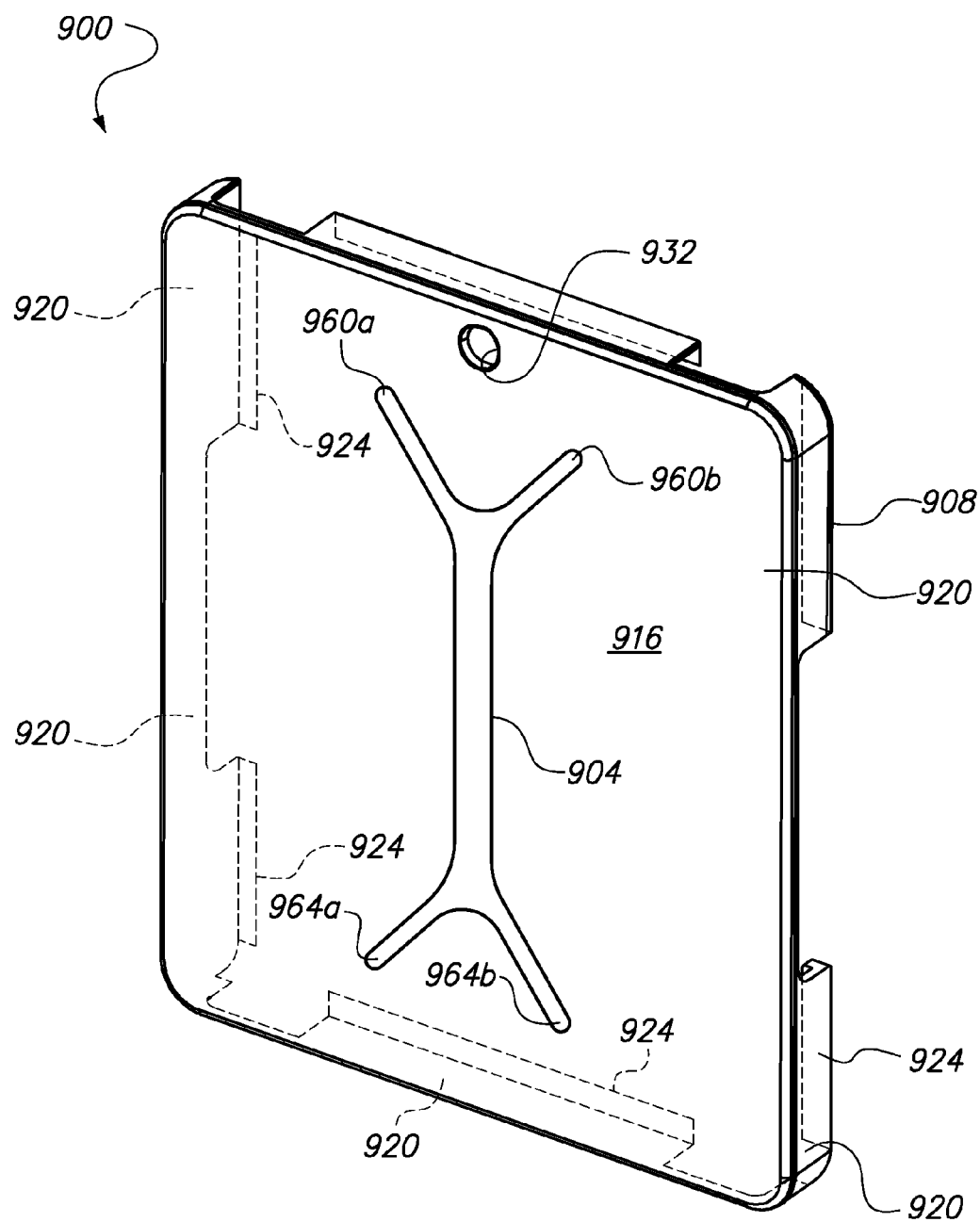
FIG. 9 illustrates still another embodiment of a device case having a strap according to the present invention.

FIG. 9 presents a case 900 having a strap 904 for use with a tablet device. A plurality of side walls 920 extend from the periphery of the interior face 912 of a base plate 908. Flanges 924 operable to secure the device to the case 900 extend inward from at least some of the side walls 920, with the base plate 908, the side walls 920 and the flanges 924 defining a device-receiving cavity. The strap 904 extends through the base plate 908 at four connection points: two upper slots 960a, 960b and two lower slots 964a, 964b. The strap 904 is movable between a rest position and a stretched position. The base plate 908 defines a grip-assist recess 972 to assist a user in grasping the strap 904 to affect such movement. Connection of the strap 904 to the base plate 908 can occur as disclosed with respect to other embodiments of the invention, or via any other means.

Figure 10:
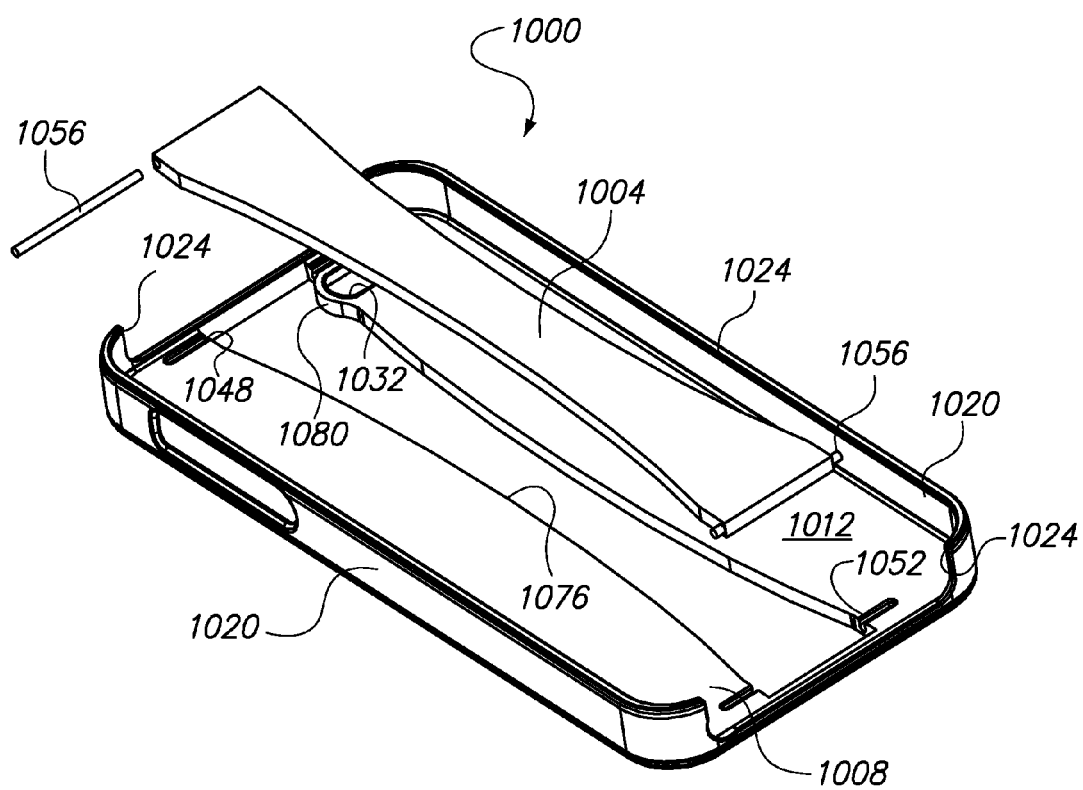
FIG. 10 illustrates another embodiment of a device case having a strap according to the present invention.

FIG. 10 illustrates a device case 1000 having a strap 1004 including a side wall 1020 extending from the periphery of the interior face 1012 of a base plate 1008. Flanges 1024 operable to retain the device within the case 1000 extend inward from the side wall 1020, with the base plate 1008, the side wall 1020 and the flanges 1024 defining a device-receiving cavity. The base plate 1008 defines a camera aperture 1032, with the interior face 1012 of the base plate 1008 defining upper and lower recesses 1048, 1052 for receiving mounting pins 1056 to mount the strap 1004 thereto. In this embodiment the strap 1004 has an opening extending from one edge of the strap to the other edge of the strap. The mounting pins 1056 extend through strap opening. The pins 1056 are configured to be longer than the end of the strap 1004 to thereby extend beyond the end of the strap. The pins 1056 secure into the case at recess 1048 to there by secure the strap the case. The pins 1056 may be removable to replace the strap 1004 for customization, damage replacement, or wear. The base plate further defines a strap aperture 1076 there-through, allowing access to the strap 1004 from the exterior of the case 1000 without threading the strap 1004 through slots in the base plate 1008. It should be appreciated that the shape of the strap 1004 and the contour of the strap aperture 1076 are influenced by the positioning of the camera aperture 1032. The base plate 1008 forms a tab 1080 at least partially defining the strap aperture 1076, with the strap 1004 having a corresponding tab-shaped indentation, thus allowing the strap 1004 to be positioned flush with the case 1000 within the strap aperture 1076 when in the rest position.

Figure 11:
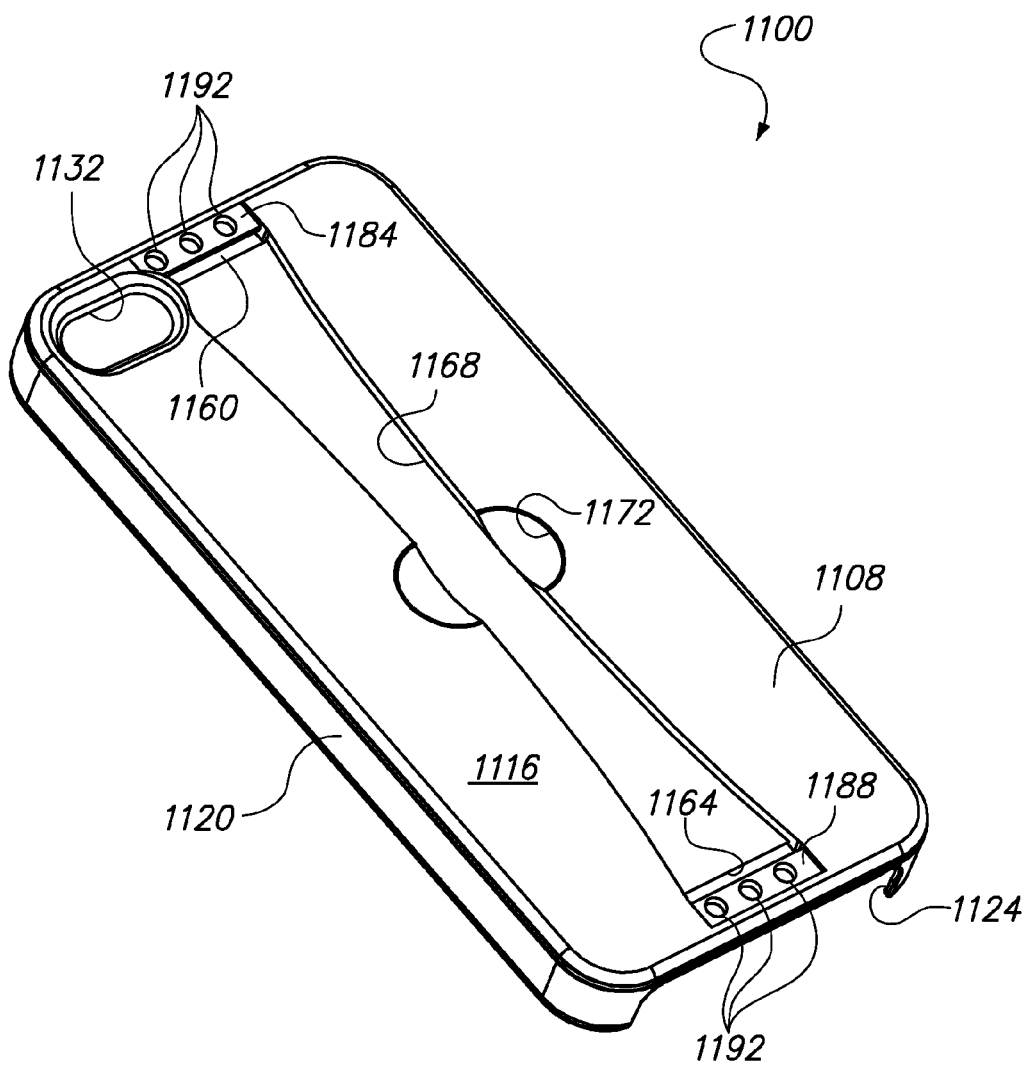
FIG. 11 illustrates yet another embodiment of a device case having a strap according to the present invention.

FIG. 11 illustrates the exterior of a device case 1100 including a side wall 1120 extending from the periphery of an interior face (not shown) of a base plate 1108. Flanges 1124 operable to secure the device to the case 1100 extend inward from the side wall 1120, with the base plate 1108, the side wall 1120 and the flanges 1124 defining a device-receiving cavity. The base plate 1108 defines a camera aperture 1132 and a grip-assist recess 1172 to assist a user in moving the strap, when attached, between a rest position and a stretched position. The base plate 1108 further includes an upper slot 1160 and a lower slot 1164, with upper and lower tabs 1184, 1188 seated within the slots 1160, 1164. The tabs 1184, 1188 include openings 1192 for receiving pins or screws (not shown) to attach the strap to the base plate 1108. In the case of injection molding of strap material to the case 1108, the holes may also be filled with the strap material, such as when in liquid or semi-liquid state, to thereby secure the strap to the case as part of the molding of the strap to the case. The strap material in and around the holds secures the strap to the case.

The strap then extends through the base plate 1108 at the slots 1160, 1164. The exterior face 1116 of the base plate 1108 defines a strap recess 1168 in which the strap sits when in the rest position, such that the strap does not break the plane of the base plate 1108 when in the rest position.

Figure 12:
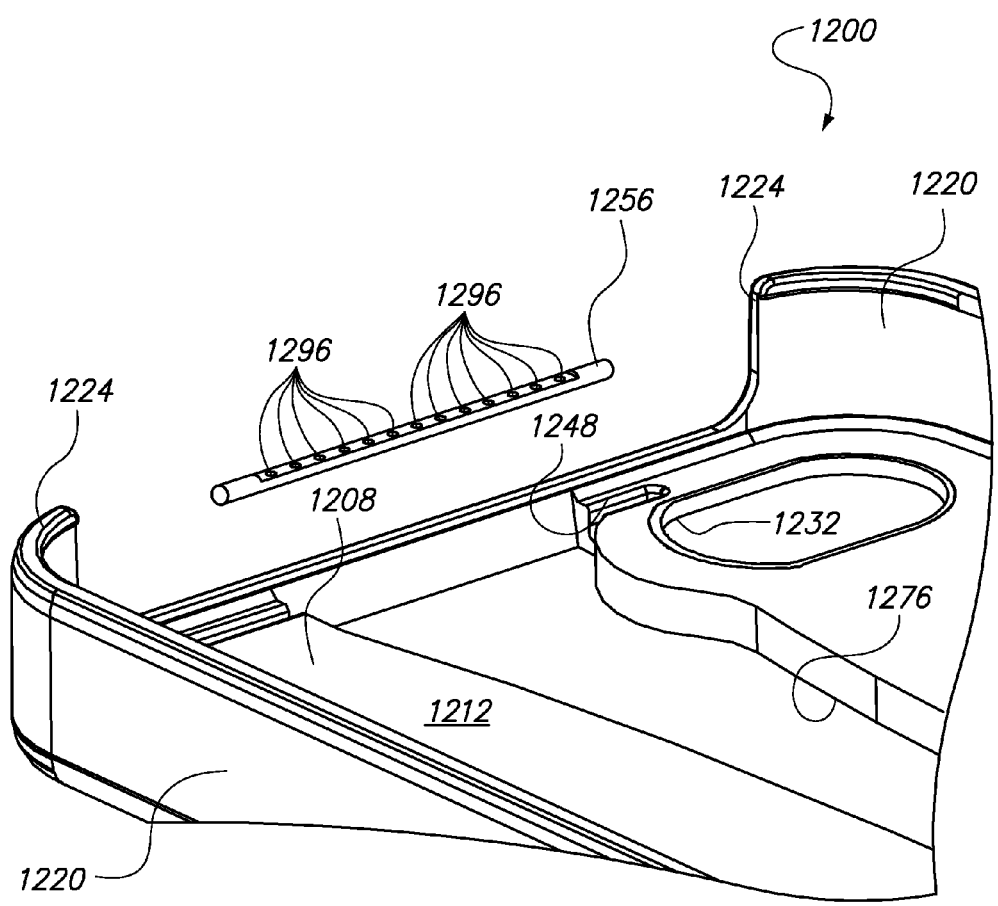
FIG. 12 illustrates an enlarged view of a device case having a strap according to the present invention.

FIG. 12 illustrates a close-up view of the interior of a device case 1200 having a strap (not shown). A side wall 1220 extends from the periphery of the interior face 1212 of a base plate 1208. Flanges 1224 operable to retain the device adjacent to the case 1200 extend inward from the side wall 1220, with the base plate 1208, the side wall 1220 and the flanges 1224 defining a device-receiving cavity. The base plate 1208 defines a camera aperture 1232 and a strap aperture 1276 therethrough. The interior face 1216 of the base plate 1208 defines a recess 1248. A mounting pin 1256 seats within the recess 1248 to connect the strap to the base plate 1208. In this embodiment, the pin 1256 includes a plurality of openings 1296 formed within a recess. The pin 1256 is coated with an adhesive and placed within a mold used to form the strap prior to injection of liquid or semi-solid, such that the molding process affixes the pin 1256 to the strap. The openings 1296 within the pin 1256 provide additional surface area to which the strap material flow into and can adhere, thus strengthening the connection between the strap and the pin 1256.

Figure 13:
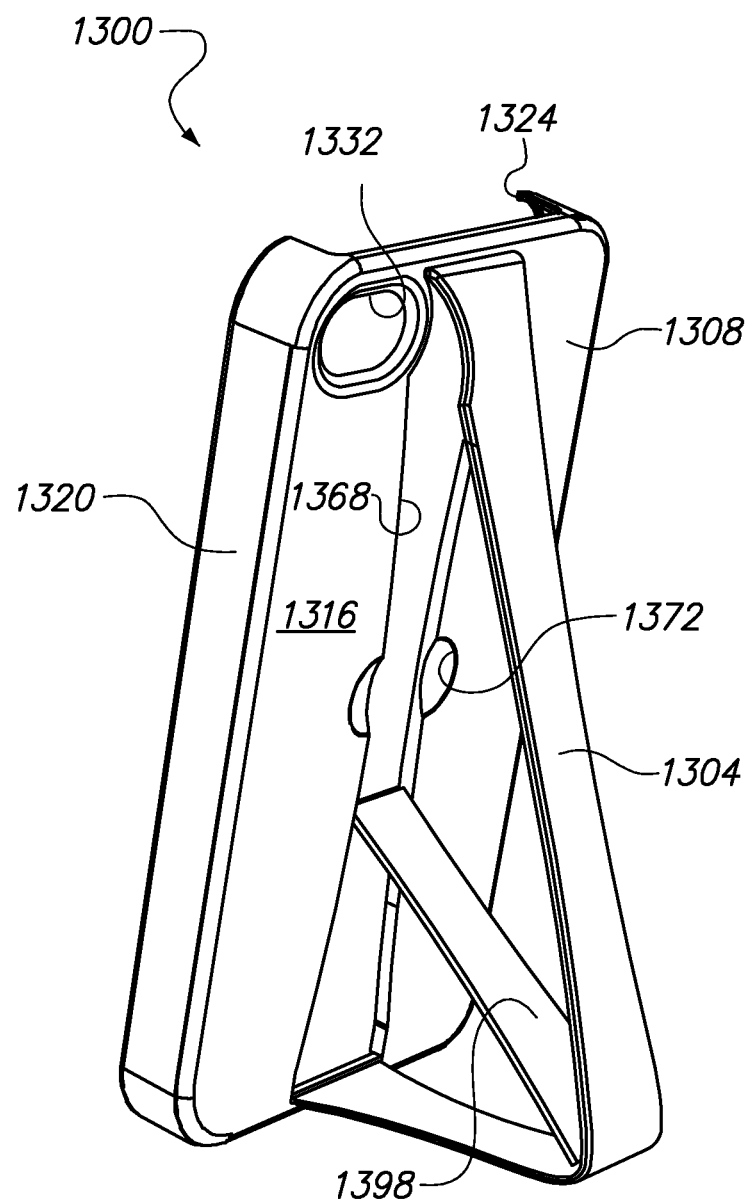
FIG. 13 illustrates a device case having a strap and a hinged arm operable to support the device in a relatively upright position according to the present invention.

FIG. 13 illustrates a device case 1300 having a strap 1304 and a hinged arm 1398 operable as a kickstand. A side wall 1320 extends from the periphery of in the interior face (not shown) of a base plate 1308. Flanges 1324 operable to retain the device adjacent to the case 1300 extend inward from the side wall 1320, with the base plate 1308, the side wall 1320 and the flanges 1324 defining a device-receiving cavity. The base plate 1308 defines a camera aperture 1332 therethrough, while the exterior face 1316 of the base plate 1308 defines a strap recess 1368 and a grip-assist recess 1372. The strap 1304 attaches to and extends through the base plate 1308, and is movable between a rest position, wherein the strap 1304 lies flush with the base plate 1308 within the strap recess 1368, and a stretched position.

The arm 1398 connects to the base plate 1308 within the strap recess 1368, and seats within the strap recess 1368 beneath the strap 1304 when not in use. The arm 1398 may be hinged around a pin or other connector at the location closest to the base plate 1308. The arm 1398 could also be press fit or connect/secure to the base plate 1308 at lugs or slots. The arm 1398 rotates outward with respect to the base plate 1308 to a supporting position as shown. In the supporting position, the arm 1398 supports the device such that the device is relatively upright. The angle between the arm 1398 and the base plate 1308 may be adjusted as necessary to achieve the desired viewing angle. As the arm 1398 rotates to the supporting position, the bottom of the arm 1398 selectively stretches the strap 1304 where the arm 1398 contacts the strap 1304, thereby moving the strap 1304 from the rest position to a stretched position. The strap 1304, being biased toward the rest position, increases the stability of the device when the arm 1398 is in the supporting position, while also preventing the arm 1398 from scuffing a surface upon which the device may rest.

Figure 14A:
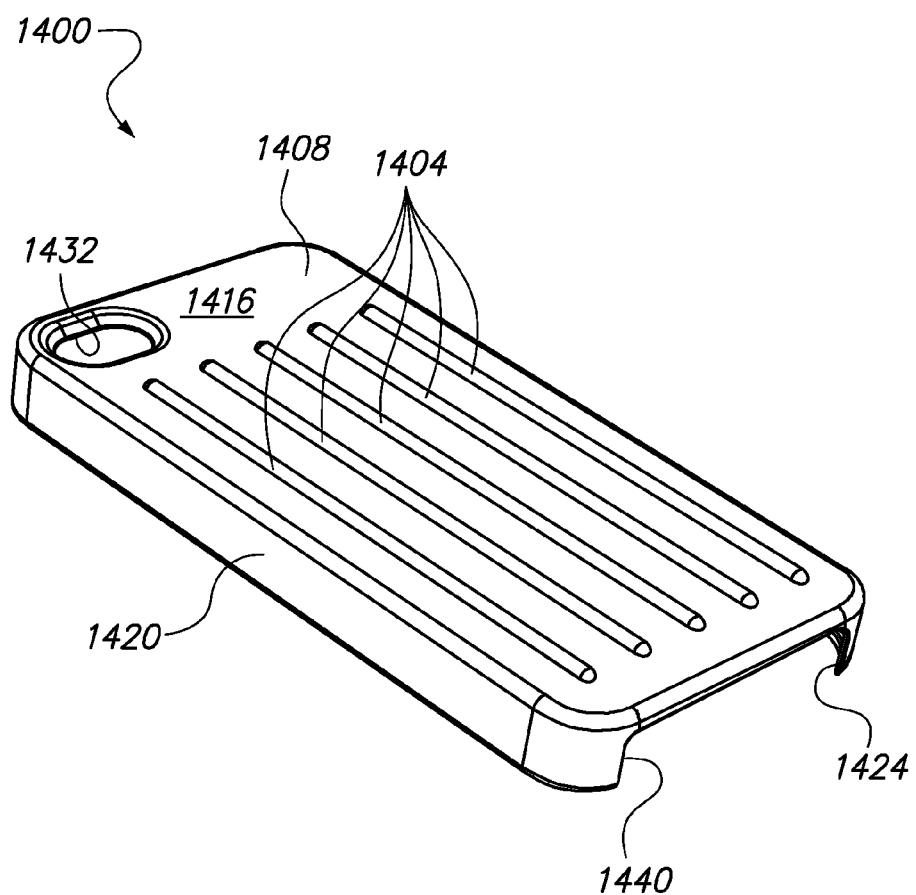
FIG. 14A illustrates a device case having a plurality of straps according to the present invention, with the straps shown in a rest position.
Figure 14B:
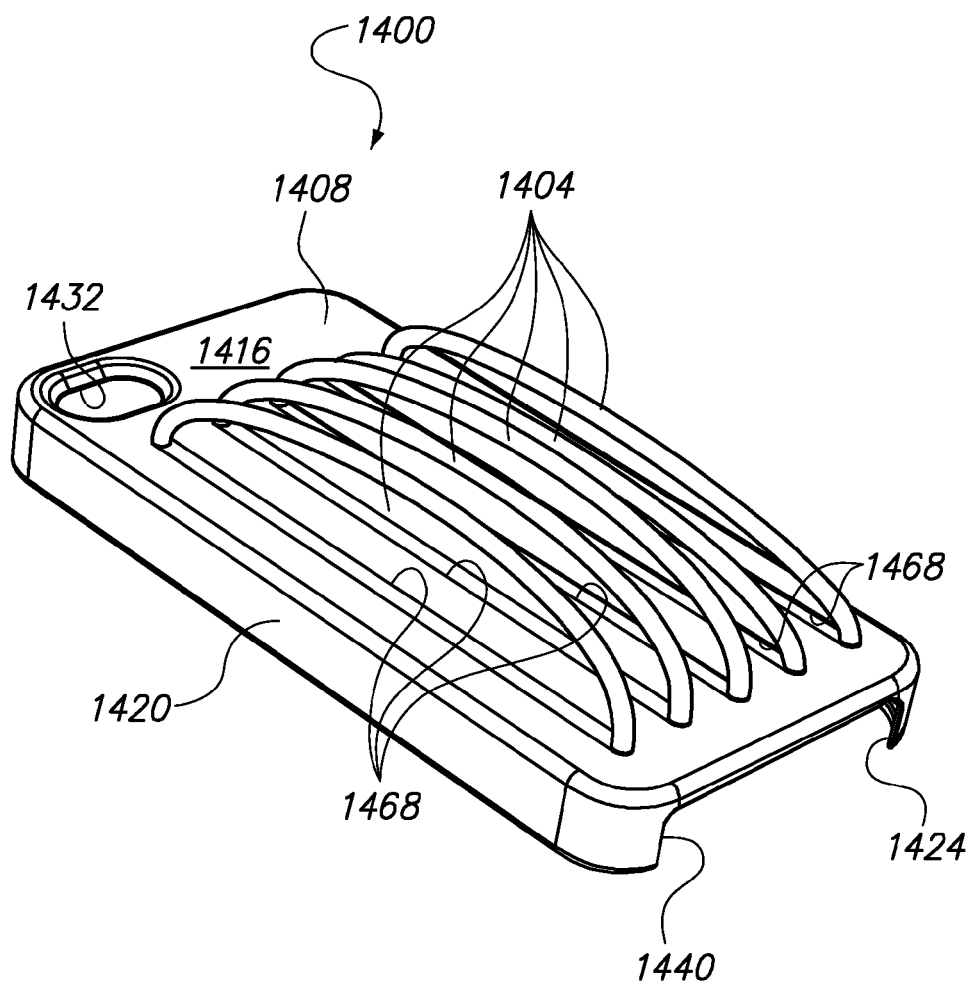
FIG. 14B illustrates the device case of FIG. 14A, with the straps shown in a stretched position.

FIGS. 14A & 14B illustrate a device case 1400 having a plurality of straps 1404. A side wall 1420 extends from the periphery of an interior face (not shown) of a base plate 1408. Flanges 1424 operable to retain the device adjacent to the base plate 1408 extend inward from the side wall 1420, with the base plate 1408, the side wall 1420 and the flanges 1424 defining a device-receiving cavity. The base plate 1408 defines a camera aperture 1432 and a lower aperture 1440, as well as strap recesses 1468 (shown in FIG. 14B). In this embodiment, multiple straps 1404 are attached to the base plate 1404. The straps 1404 are movable between a rest position as shown in FIG. 14A, wherein the straps 1404 lie within the strap recesses 1468 relatively flush with the base plate 1408, and a stretched position, as shown in FIG. 14B. The straps 1404 may connect to the base plate 1408 as described with respect to other embodiments, or in any other manner. In this embodiment, the straps 1404 partially extend beyond the plane of the base plate 1408 when in the rest position, thus allowing the straps 1404 to contact and grip a surface upon which the case 1400 rests to prevent slippage.

Many modifications are possible within the scope of the present invention. For example, a portion of the strap 104 may extend beyond the plane of the base plate 108 to act as a stop, preventing the device from sliding off of a smooth surface. Such a stop may also be integral with the base plate 108. A plurality of straps 104 may also be used. This may be especially useful when the device is significantly larger than a user's hand, such as with a tablet. A case 100 for a tablet could include four straps 104, with two running laterally and two running longitudinally. Such an arrangement would allow dual hand-securing whether the tablet was oriented horizontally or vertically with respect to the user. Additionally, the strap 104 may positioned anywhere on the base plate 108 within the scope of the present invention. For example, the base plate 108 may include the side wall 120, with the strap 104 lying flush with the side wall 120 in the rest position. The case 100 may also include a pocket (not shown) for storing substantially flat items such as identification cards, credit cards or cash. The pocket may fully cover stored items, or may only partially cover stored items.

While the various modes for carrying out the invention have been described in detail, it is to be understood that the terminology used is intended to be in the nature of words and description rather than of limitation. Those familiar with the art to which this invention relates will recognize that many modifications of the present invention are possible in light of the above teachings. It is therefore to be understood that within the scope of the appended claims, the invention may be practiced in a substantially equivalent way other than as specifically described herein.

What is claimed is:

1. A case for a portable electronic device comprising:
a base plate having an front wall and a back wall;
a device securing mechanism operable to retain the electronic device adjacent to the front wall of the base plate;
a stretchable strap fixed to the base plate at opposite edges of the base plate, the stretchable strap extending in a direction perpendicular to the opposite edges, and the stretchable strap having an hourglass shape;
a strap recess on an exterior surface of the base plate, the stretchable strap being biased toward a rest position within the strap recess, the strap being flush with the base plate in the rest position, and the strap being configured to be stretchable between the rest position and a stretched position spaced from the base plate;
a grip assist recess defined on the exterior face of the base plate adjacent to the strap recess, the grip assist recess facilitating gripping of the strap when in the rest position in the recess;
at least two attachment recesses in the base plate, one along each opposite edge, the at least two attachment recesses extending from the front wall of the base plate into the base plate; and
an attachment structure associated with each attachment recess and configured to secure the strap to the base plate by extending from the strap and at least a portion of the attachment structure that extends from the strap being located within one of the attachment recesses at each opposite end of the base plate such that at least a portion of the strap extends on both sides of the attachment structure in the direction of each opposite edge of the base plate.

2. The case of claim 1, wherein the device securing mechanism comprises:
a side wall extending from the base plate; and
a flange extending from the side wall, the flange retaining the device adjacent to the base plate.

3. The case of claim 1, wherein the base plate includes a side wall extending from first and second opposite edges of the base plate, and the strap extends from the sidewall extending from the first opposite edge to the sidewall extending from the second opposite edge.

4. The case of claim 1, wherein a slot extends through the base plate from the exterior surface to an interior surface, such that the strap connects to the base plate at the interior surface and extends through the slot to expose and allow access to the strap from the exterior surface of the case.

5. The case of claim 1, further including a hinged arm extending from the base plate to selectively stretch the strap.

6. The case of claim 1, wherein the strap attaches to the base plate with a pin.

7. The case of claim 6, wherein the strap is formed using injection molding, with the pin being placed into the mold prior to injection.

8. A case for a portable electronic device having a front and a rear, said case comprising:
a base plate having an interior face and an exterior face;
a device securing mechanism operable to retain the device adjacent to the base plate such that the rear of the device rests against the interior face of the base plate while the front of the device remains substantially uncovered for interaction by a user;
a strap having first and second ends, a width of the strap at the first and second ends being greater than a width of the strap between the first and second ends, the strap being connected to the base plate at the first and second ends of the strap, the first and second ends of the strap being disposed at opposite edges of the base plate, the strap running from a first opposite edge to the second opposite edge;
a strap recess in which the strap rests in the strap recess and flush with the exterior face of the base plate when in a rest position, the strap being movable between the rest position and a stretched position, with the strap having an elasticity sufficient to bias the strap toward the rest position in the recess;
a grip assist recess defined on the exterior face of the base plate adjacent to the strap recess, the grip assist recess facilitating gripping of the strap when in the rest position in the recess, the exterior face, the strap recess, the grip assist recess, device securing mechanism, and the strap in the rest position forming a surface unencumbered by projections from the exterior surface of the base plate; and at least two attachment recesses in the base plate, at least one along each of the opposite edges, the at least two attachment recesses extending from the interior face of the base plate into the base plate; and a strap securing structure associated with each attachment recess that is used to secure the strap to the base plate, the strap securing structure extending from the strap such that at least a portion of the strap securing structure that extends from the strap is located within one of the attachment recesses such that at least a portion of the strap extends on both sides of the attachment structure in the direction of an opposite edge of the base plate that is closest to the attachment recess.

9. The case of claim 8, wherein the base plate includes a side wall extending from the first and second opposite edges of the base plate, and the strap extends from the sidewall extending from the first opposite edge to the sidewall extending from the second opposite edge.

10. The case of claim 8, wherein the device securing mechanism comprises:
a side wall extending from the base plate; and
a flange extending from the side wall, with the flange retaining the device adjacent to the base plate.

11. A case for a portable electronic device, the electronic device having a back surface and a front surface, the case comprising:
a base plate having an interior face and an exterior face;
an electronic device securing mechanism operable to retain the back surface of the electronic device against the interior face of the base plate;
a flexible strap having a first strap end and a second strap end, the flexible strap attached to the base plate and movable between a rest position and a stretched position, with the strap being accessible from the exterior of the case, the flexible strap being fixed to the base plate at opposite edges thereof, the flexible strap extending from the first strap end to the second strap end in a direction perpendicular to the opposite edges, and the flexible strap having an hourglass shape;
a strap recess defined on the exterior face of the base plate, the flexible strap being located within the strap recess when in the rest position lying flush with or below the exterior face of the base plate;
a first attachment recess near a first edge of the base plate, the first attachment recess extending into the interior face of the base plate;
a second attachment recess near a second edge of the base plate, the second edge of the base plate opposite the first edge of the base plate, the second attachment recess extending into the interior face of the base plate;
a first attachment structure configured to connect the first strap end to the first attachment recess;
a second attachment structure configured to connect the second strap end to the second attachment recess; and
a grip assist recess defined on the exterior face of the base plate adjacent to the strap recess, the grip assist recess facilitating gripping of the strap when in the rest position in the recess
wherein the base plate includes a slot extending through the base plate, with the strap connecting to the base plate such that at least a portion of the first strap end extends beyond the first attachment structure in the direction of the first edge and at least a portion of the second strap end extends beyond the second attachment structure in the direction of the second edge, and at least a portion of the strap extending through the slot to provide access to the strap from the exterior face of the case.

12. The case of claim 11, wherein the device securing mechanism comprises:
a side wall extending from the base plate; and
a flange extending from the side wall, with the flange securing the device to the base plate.

13. The case of claim 12, wherein the side wall extends from the interior face of the base plate.

14. The case of claim 12, wherein the side wall extends substantially perpendicularly from the base plate and the flange extends substantially perpendicularly from the side wall, such that the flange and the base plate are substantially parallel.

15. The case of claim 1, wherein the strap recess is an aperture in the base plate extending from the exterior surface to an interior surface of the base plate.

* * * * *